United States Patent [19]

Hird

[11] 4,419,672
[45] Dec. 6, 1983

[54] POINT LOCATOR AND GRAPHICS DIGITIZER SYSTEM

[76] Inventor: Edwin A. Hird, 10200 DeSoto Ave., #331, Chatsworth, Calif. 91311

[21] Appl. No.: 783,608

[22] Filed: Apr. 1, 1977

[51] Int. Cl.$^3$ .............................................. G01D 5/16
[52] U.S. Cl. .............................. 346/33 M; 33/1 M;
178/18; 360/6
[58] Field of Search ................... 346/33 R, 29, 33 M, 346/33 MC; 178/18–20; 33/1 M, 140, 139; 235/61.6 A, ; 360/4, 6

[56] References Cited

U.S. PATENT DOCUMENTS

| | | | |
|---|---|---|---|
| 2,156,907 | 5/1939 | Volz | 33/138 |
| 3,832,781 | 9/1974 | Flagge | 346/33 R |
| 3,916,100 | 10/1975 | Azuma | 178/18 |

Primary Examiner—Joseph W. Hartary

[57] ABSTRACT

A system for accurately locating upon a surface any number of finite points, recording those locations together with such additional information as is desired to be applied to the surface, and then transferring such recorded information to that surface in defined relation to the recorded point locations. The point locator incorporates a pair of potentiometers positioned to provide output signals representative of both X and Y coordinates, the locating signals being generated responsive to movement of a cursor head connected to the potentiometers through an extensible potentiometer rotating means to thereby actuate one or both potentiometers in amounts representative of a series of given X-Y cursor positions.

40 Claims, 21 Drawing Figures

POINT LOCATOR AND GRAPHICS DIGITIZER SYSTEM

BACKGROUND OF THE INVENTION

This invention relates to an apparatus for providing accurate point location information particularly in relation to X and Y coordinates on a surface such as a drafting board, for example, through the use of a unique electro-mechanical system which supplies analog information to an analog-to-digital converter and onward to a suitable recording system. The resulting information is utilized in a highly effective and efficient manner, particularly for the purpose of affixing data to the surface of a drawing or the like.

In current practice it is common to use graphic digitizers to convert graphic information into computer-acceptable form. Systems for accomplishing such results permit the operator to locate a series of selected points or lines upon a surface. Such apparatus is used widely, in conjunction with engineering drafting procedures, for cartography activities.

It has been found in utilizing systems of this character for engineering drafting purposes that while they are effective in reducing the time required for the preparation of the drawings themselves, little attention has been given to the use of time-saving apparatus for accurately locating the best positions and entering upon the surface of such drawings appropriate information in the nature of technical notes, legends, symbols, identifying indicia, etc. Through the utilization of the present invention, the draftsman, cartographer and people in many technical regimes can save valuable time in printing such messages upon the surfaces of drawings or the like through the expedients provided by the point locator and digitizer of this invention. They may thereby define at various locations upon the face of the document of interest the beginning positions for the messages to be affixed thereupon. That information to be affixed to the surface may then be entered directly, the total location and message information being supplied to a digitizer and recorded in a suitable form such as, for example, a magnetic memory, a magnetic tape or the like.

The preferred embodiment of this invention is in the form of a single housing unit which encompasses a pair of potentiometers. The potentiometers are actuated by an extensible arm, an extremity of which has a cursor attached thereof. The potentiometers are electrically connected through an A/D converter to a digitizer and a recording device. However, the specific structural form of the invention may vary to include a pair of separately housed potentiometers independently connected to extensible and/or rotatable arms, the only requisite being the use of a single cursor which, when moved, is capable of indicating the dual X and Y axes inputs required for point locations.

An objective of this invention is to provide in a locator system an implementing combination of elements for accurately locating upon the surface of a document the desired positions for the introduction of printed or graphic information to be applied to that document, transferring, storing and retrieving the location data and utilzing that data in accomplishing the printing or graphic function.

Another objective is to provide in a digitizer system those components required for generating and recording digital information responsive to analog signals and representative of a plurality of point locations upon a flat surface, such information being retrievable for use in systematically applying pre-recorded data to that surface in relation to the point locations.

It is another objective of the invention to provide an improved means for generating as a pair of voltages an signals representative of a given point upon a surface.

A further objective of the invention is to provide an improved data input device for a high-speed electronic data processor which provides electrical signals representative of radial and angular displacements of a predetermined point upon a surface.

Yet another objective of the invention is to provide an improved means for generating electrical data, including a movable cursor, the position upon a surface of which results in the regeneration of a pair of electrical signals representing the X and Y coordinates of the position of that cursor.

Yet another object of the invention is to provide an improved system for locating a series of given points upon a surface and generating voltages representative of the coordinates of those points and supplying those voltages to a converter for transforming analog signals into digital form.

Still another objective of this invention is to provide means whereby analog signals supplied to an analog-to-digital converter, digitized, and recorded may be retrieved and utilized to drive a printer over a surface from which the data was originally derived and printing pre-determined data upon that surface at pre-determined locations.

The particular features of the invention will be better understood and its advantages will be recognized upon examination of the following description and the accompanying drawings. It is understood, however, that the specification and drawings are for purposes of illustration only and are not intended to define the scope or limit of the invention, such scope and limit being restricted only in accordance with the appended claims.

DETAILED DESCRIPTION OF THE DRAWINGS

Figure 1:
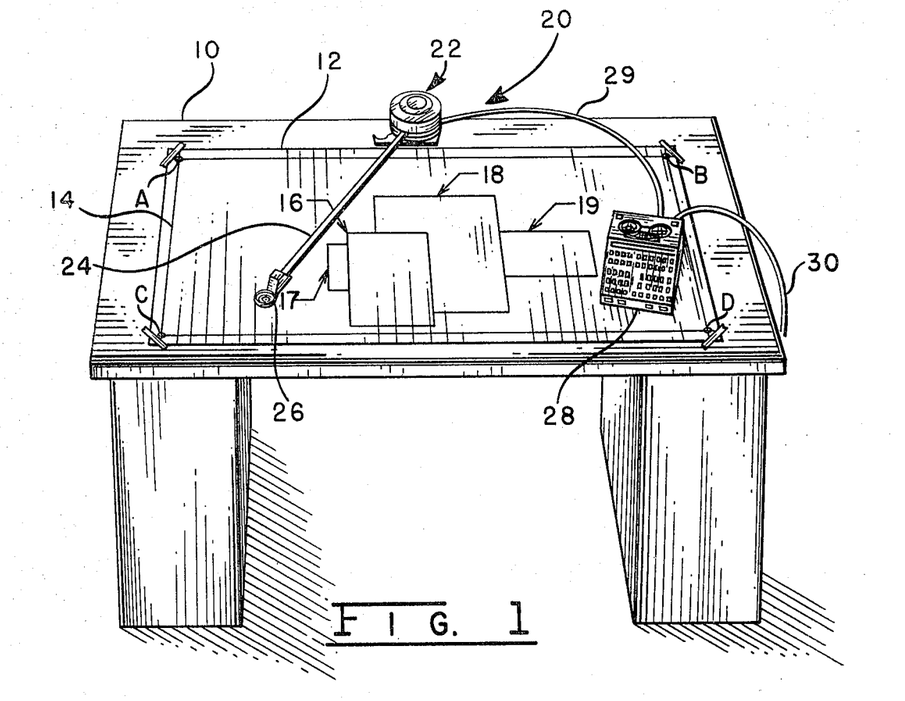
FIG. 1 is a perspective view of the basic point locator of this invention in a basic configuration, shown affixed to a drafting board and connected to a tape recorder.

Looking now at FIG. 1, there is shown a drafting board 10 of conventional configuration representative of a large number of drafting boards or other tables capable of utilization with this invention. Standardly affixed to the surface of the table 10 is a representative drawing paper 12 having a series of border limits 14 defined thereon. The drawing paper 12 is representative only of any two-dimensional surface containing an infinite number of point locations and with respect to which this invention may be applied. Upon the surface of the paper 12 are a series of locations 16, 17, 18 and 19 representative of line work or locations within which lettering may be applied in conjunction with other data such as drawings upon the surface of the paper.

Figures 4, 5:
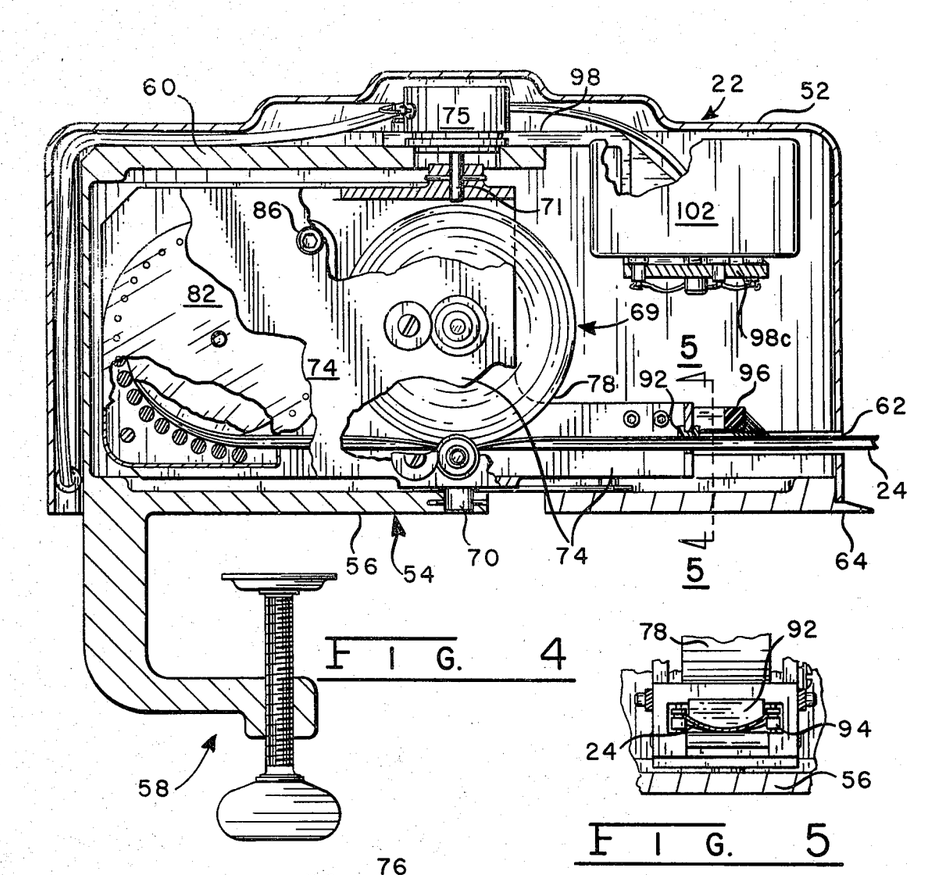
FIG. 4 is a sectional view of the locator taken substantially along the line 4—4 of FIG. 3 and cut away to better illustrate its components.
FIG. 5 is a sectional view taken along line 5—5 of FIG. 4.

Positioned upon the drafting board 10 is the locator system 20 of this invention capable of identifying a point in a plane representative of two coordinates. It generally comprises a locator 22 with an extensible arm rule 24 extending therefrom and a cursor 26 upon the end of the arm. In the preferred embodiment of my invention, as particularly shown in FIGS. 3-6, 8, 9 and 12 and as described in further detail in my prior patent application Ser. No. 702,745, infra, the extensible arm rule 24 (sometimes referred to herein as a flexible rule or tape) is a thin band which is curved in cross-section. The properties of this band are such that it may be rolled like a spring for storage, as indicated in FIG. 4, but it becomes straight and relatively rigid when extended. A tape recorder 28 is interconnected by an electrical connector 29 and an electrical wire 30 leads to the recorder 28 from an electrical source.

The function and operation of these various components will be described in conjunction with their respective detailed descriptions.

Figure 2:
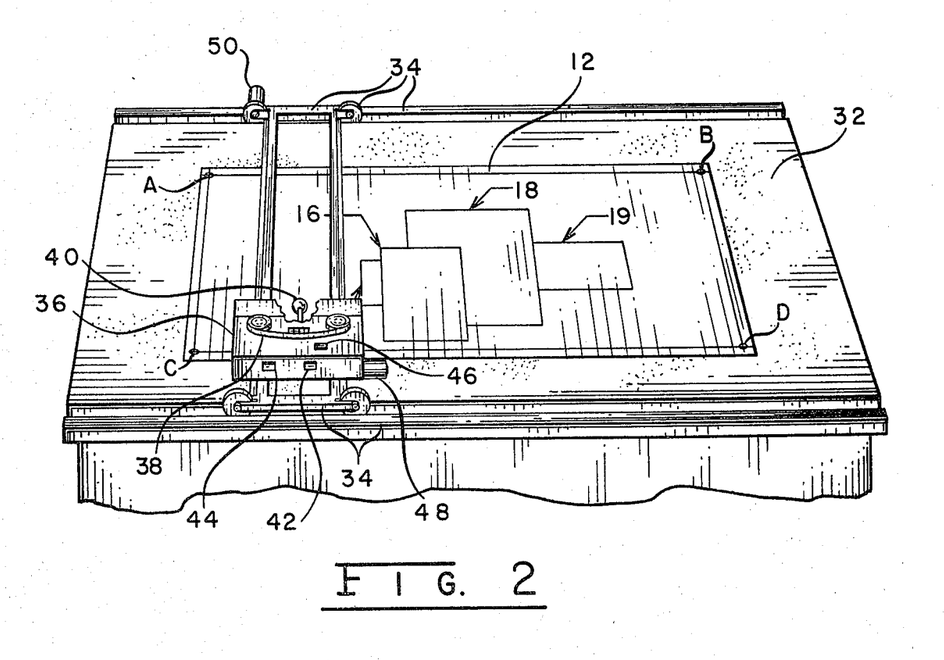
FIG. 2 is a illustration of a vacuum table similar to the drafting board in FIG. 1, and depicting a tape driven typewriter mounted upon a carriage for movement over the table surface and for typing messages upon the drawing affixed to the vacuum table.
Figure 3:
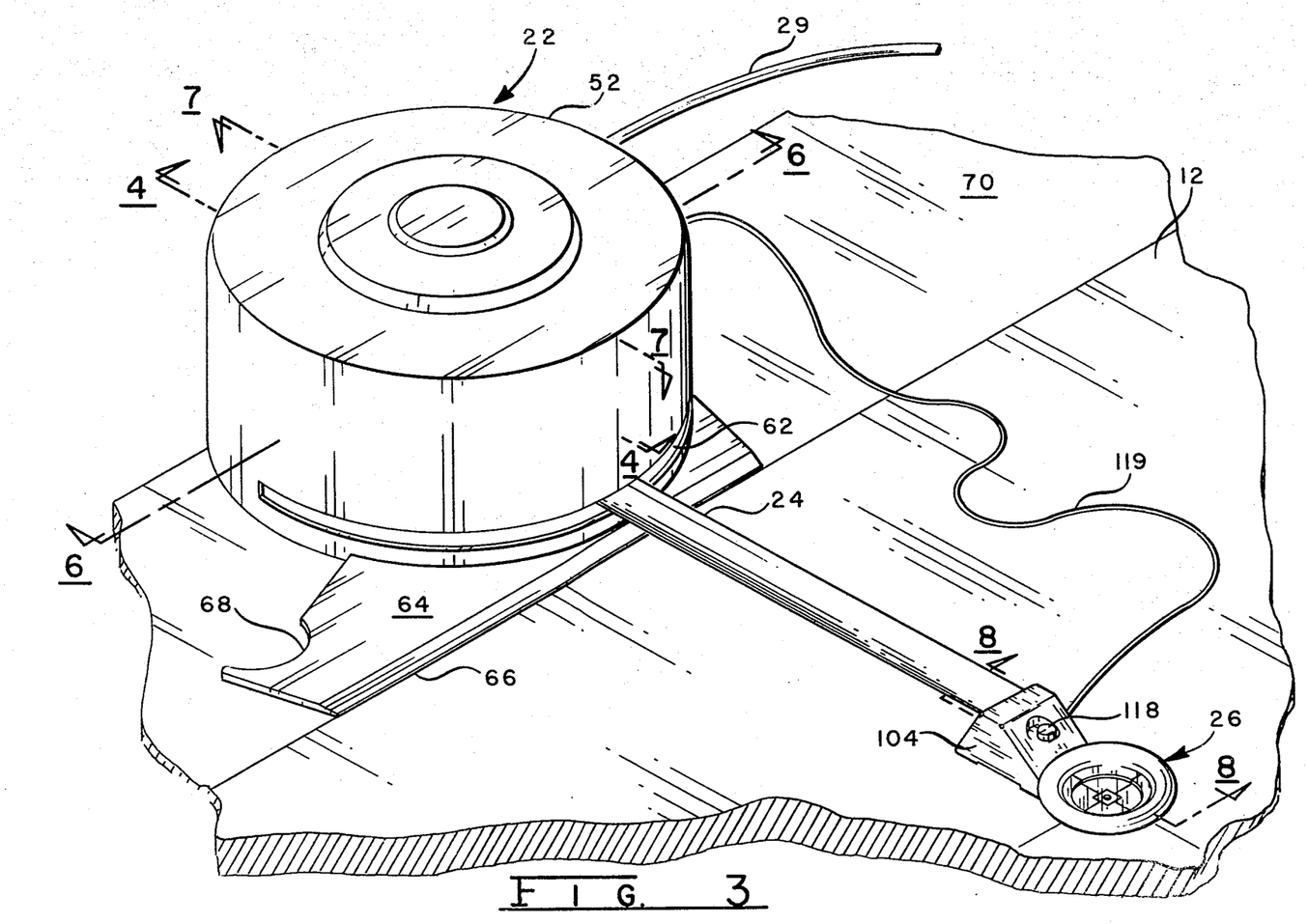
FIG. 3 is an enlarged isometric view of the point locator proper in a principal embodiment.

The illustration of FIG. 2 represents a typical system through which the data produced by this invention is utilized, by applying indicia to the surface of a drawing. Therein a table 32, which is typically a vacuum table of standard construction, has affixed to its surface the same drawing 12 illustrated in FIG. 1. Mounted upon a conventional X-Y drive bed 34 is a tape-driven typewriter 36 positioned to be moved horizontally and vertically over the surface of the table 32. Positioned upon the typewriter 36 is a recorded tape 38 upon which is stored that information produced by the locator 22. The typewriter 36 includes a lettering font 40, an on-off switch 42, an input switch 44 and a set point switch 46. It is driven vertically by the vertical (Y-axis) drive 48 and in the horizontal direction by the horizontal (X-axis) drive mechanism 50.

Now in greater detail, as illustrated in FIGS. 3-12, the primary portion of this invention, encompassing the locator and its extensible arm and cursor, are shown in this primary embodiment. Therein, the locator 22 includes a housing or case 52 appropriately affixed to and over an inner housing 54. This inner housing has a base portion 56 which incorporates an integral clamp means 58 and an upper portion 60. Whereas the housing 52 provides primarily a dust cover, the inner housing 54 is constructed as a structural support for the various components to be described. The housing 52, however, does include adjacent its lower skirt portion a horizontal opening in the form of a slot 62 to facilitate the movement therethrough of the extensible arm 24. Attached to the base 56, usually as an integral portion thereof, is a paper straightener 64. It extends outwardly from the locator 22 and incorporates a straight edge 66 of sufficient length to accommodate abutment thereagainst of the paper 12, for example, so as to orient that paper in appropriate relation to the positioning of the locator 22. The paper straightener 64 may also include a nesting recess 68 for the cursor 26 for periods during which the locator is not in use.

Retained for rotation co-axially within the locator 22 is a measuring system 69 mounted upon a pair of shafts 70 and 71, the lower shaft 70 being fixedly pinned to the base 56 and the upper shaft 71 being similarly pinned to a rotatable case 74 of the system 69. Upon the lower shaft 70, through a bearing 72, is mounted the pivotable case 74. The shaft 71 extends from and is in fact the rotatable drive shaft of a signal generator in the form of a first potentiometer 75 fixedly supported on the upper housing 60, as by a plurality of cleats 76, held by screws 77.

Within the pivotable case 74, for movement therewith and for relative rotation with respect thereto, are a potentiometer drive wheel 78 for driving a second potentiometer 80 mounted upon the exterior of the case 74 and a tape holder 82 (FIG. 4). The latter components are oriented and adapted to accomplish their functions in relation to this invention in the manner described in my patent application Ser. No. 702,745, filed July 6, 1976, and entitled "A Measurement Conversion and Visual Display Instrument" now abandoned. This application and all of its teachings are hereby incorporated by reference into the present patent application.

Figure 6:
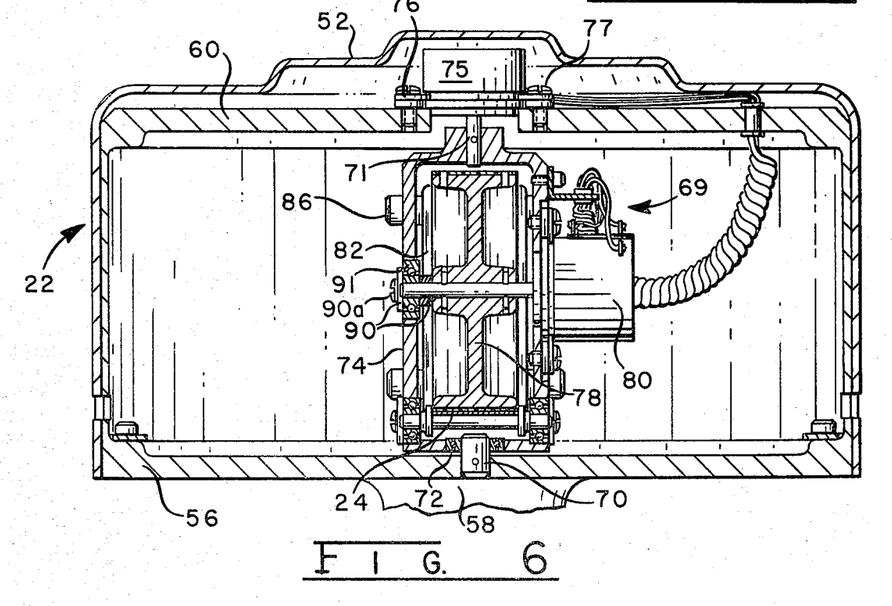
FIG. 6 is a sectional view taken along line 6—6 of FIG. 3.
Figure 7:
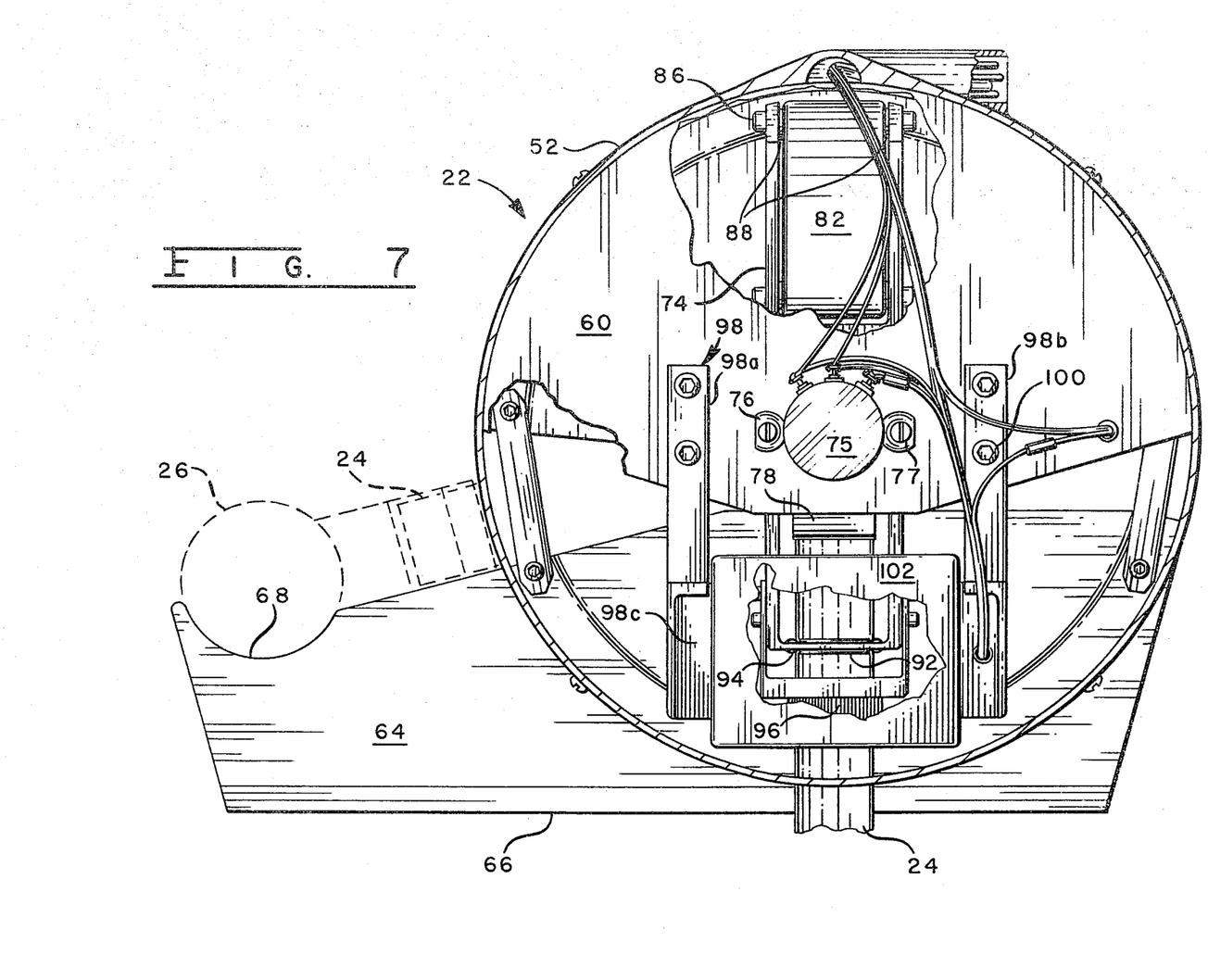
FIG. 7 is a horizontal section taken along line 7—7 of FIG. 3 and partially cut away for better illustration of several components.

The feature in the present invention of mounting the measuring system 69 for pivotal rotation in the manner illustrated and described is a feature distinct from that of the teachings of the indicated patent application. This feature, together with the provision of the potentiometer 75 for measuring any such rotation and furnishing an analog signal responsive and proportional to that movement provide one of the unique combinations of this invention. By virtue of this feature the locator 22 is provided with the capability of supplying electronic analog signals representative of both the linear distance and the angular orientation of any movement of the cursor 26. This is accomplished through the actuation of the two signal-generating potentiometers 75 and 80 responsive to such cursor movement. The tape holder 82 is retained within the generally U-shaped case 74 by a plurality of machine screws 86 and is aligned therein by a pair of alignment spacers 88 at the rearward and forward mounting positions between the respective flanges of the case 74 and the tape holder 82 (FIG. 7). Bearing retainers 90 (FIG. 6) may be positioned between the hub of the wheel 78 and a mounting bearing 91 and between the outer bearing retainer screw 90a and the bearing 91 so as to retain the bearing in position.

At a forward extremity of the case 74, as basically explained in the aforementioned patent application, is provided a vertical rule straightener 92 (FIGS. 4, 5 and 7). A horizontal rule straightener 94 (FIGS. 5 and 7) is also provided for alignment purposes in the form of a pair of rollers, one upon either side of the rule 24. These straighteners achieve particular significance in the present invention since it is important for accuracy of rotational measurement that side play of the extensible rule be minimized. A rule arm cleaner 96 is also provided in most configurations.

Attached to the upper housing portion 60 approximately centrally thereof and extending forward therefrom (best illustrated in FIG. 7) is a bracket 98 having left and right hand legs 98a and 98b. These legs are retained by a plurality of machine screws 100 and extend forward, converging in a generally U-shaped cross-sectional region 98c to provide support for an AC-to-DC power converter module 102.

Each of the potentiometers 75 and 80 includes three electrical terminals, as does also the power converter module 102. One electrical lead from an electrical terminal on each of these components leads from a power source (not shown), a lead from a terminal on each of the potentiometers leads to the power converter and a third lead on each of the components leads to the recorder 28 for functional purposes to be later described.

Turning now to the cursor as specifically shown in FIGS. 8–12 a cursor head 104 is affixed to an extremity of the extensible arm rule 24. This connection is of sufficient structural integrity to assure that movement of the cursor, irrespective of the spring resistance applied through the extensible arm 24 does not result in a disengagement of these two elements, as described in relation to FIG. 12, for example. It is preferable that the cursor head 104 be relatively heavy so as to resist movement when rested in a particular location. However, it should have a low co-efficient of friction so as not be injurious or destructive to the surface of the paper over which it moves. For this friction minimizing purpose a cutout region 104a may be provided in the lower extremity of the holder 104.

A forward extremity of the cursor holder 104 is provided with a circular ring portion 106 having a generally cupshape with a circular cutout region 108 in its lower extremity. The exterior surface of the ring portion 106 is threaded, as with male screw threads 110. A cutout or groove region 111 between the threads 110 and the major portion of the cursor holder 104 is provided to accept an internally threaded retainer ring 112 screwed upon the threads 110. An upper cursor ring portion 114 has an annular recess 114a in a lower interior region thereof to accept an upwardly extending flange 115a of a lower cursor ring portion 115. The lower ring portion 115 also includes an annular groove region 115b defined between the lower and upper portions 115 and 114, of sufficient width and depth to receive an inwardly extending flange of the retainer ring 112. The retainer ring 112 is of a thickness and internal diameter sufficiently small to make it freely rotatable within the groove 114a, but retained therein by the positioning of the upper portion 114. This upper portion is bonded or otherwise appropriately affixed to the lower portion 115 upon assembly. The lower portion 115 has an outer diameter such that it may be inserted within the internal diameter of the circular ring portion 106 and, when so positioned, the retainer ring 112 may be screwed over the threads 110 of the ring portion 106, thereby securing the relative positions of these elements. The lower cursor ring portion 115 also includes a second annular groove 115c in its inner and lower extremity so as to accept the flange 116a of a cursor disc 116.

Figure 8:
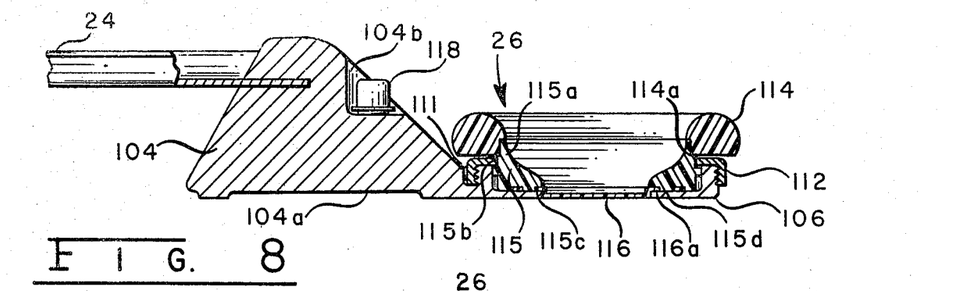
FIG. 8 is a sectional view of the cursor taken along line 8—8 of FIG. 3.
Figures 9, 10, 11, 12, 13:
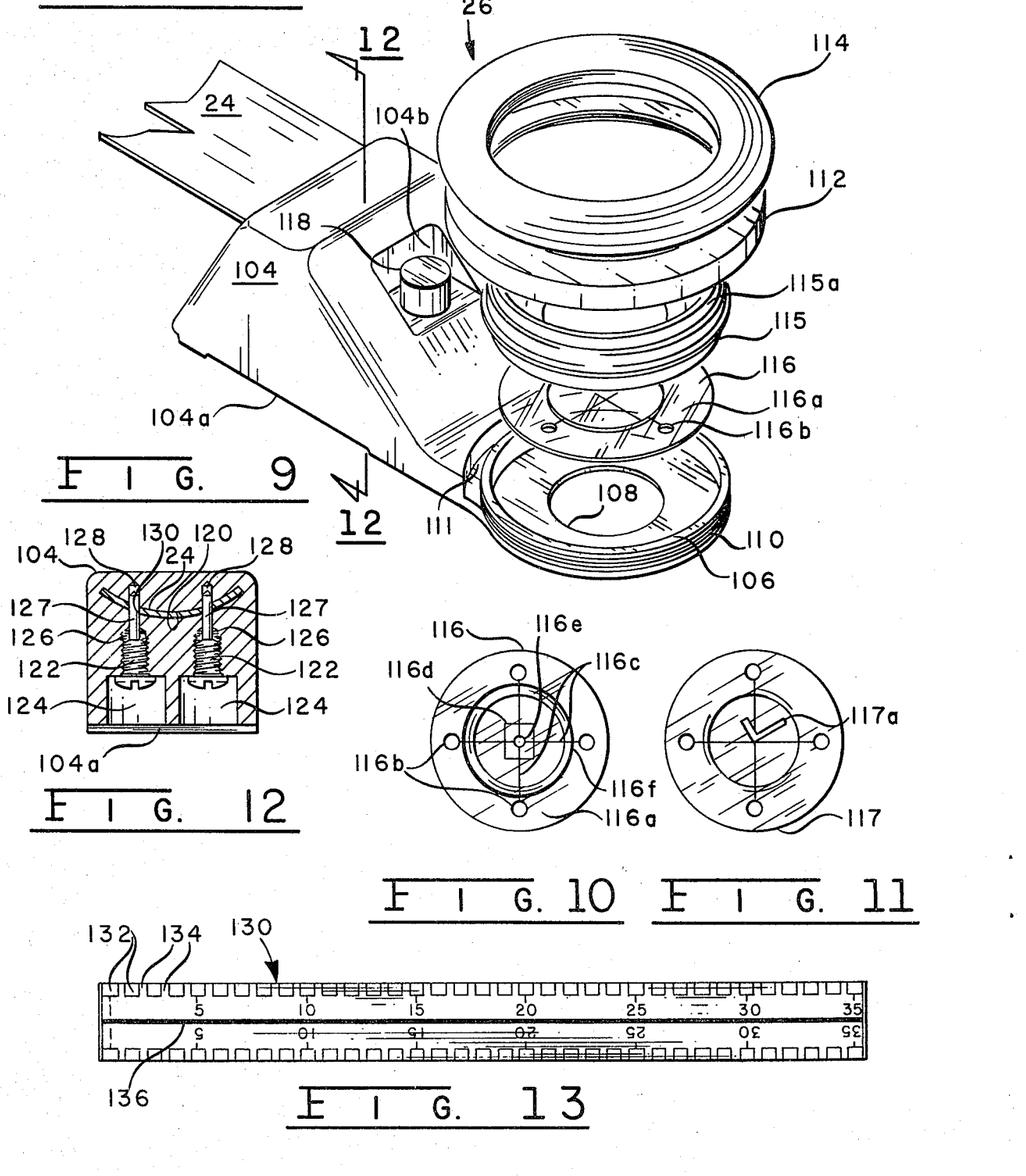
FIG. 9 is an exploded view of the cursor of FIG. 8 shown in isometric.
FIG. 10 is a flat pattern of a particular configuration of a cursor disc.
FIG. 11 is an alternative configuration of the cursor disc of FIG. 10.
FIG. 12 is a sectional view of the cursor head taken along line 12—12 of FIG. 9.
FIG. 13 illustrates a flat pattern of a typical rule utilized for type spacing.

Concerning the disc 116, it will be noted that it is stepped downward (FIG. 8) with respect to the flange 116A so that its lowest surface is essentially flush with the bottom surface of the cursor head 104. This accommodates its contact or near contact with the surface over which it is intended to move and upon which points are located. The cursor disc flange 116a includes a plurality of holes 116b therethrough to accept a plurality of detent nibs 115d which extends integrally downward from a lower surface of the lower cursor ring 115. The cursor ring and the cursor disc are thereby retained with respect to one another for coordinated movement and for orientation adjustment of the cross hairs 116c upon the lower surface of the cursor disc 116. Such cross-hair orientation may be rotationally adjusted by turning the upper cursor ring 114, attached to the lower cursor ring 115 with which the cursor disc 116 is engaged until the cross-hairs come into their proper orientation. As shown in FIG. 10 box-like hairlines 116d may be provided around the crossed region of the cross-hairs 116c to indicate the type size of a particular type font. A color coded ring 116f may be provided to indicate any of various type fonts. A central perforation 116e may also be provided to facilitate a pencil lead point to be used to mark the surface of the drawing at any specific location.

An alternative or secondary embodiment of the disc may be provided in the FIG. 11 configuration and illustrated as disc 117, the only difference being the utilization of a cutout region 117a centrally of the disc surface in the nature of a check mark, with its exact corner region located upon the cross of the hairs. This provides ease for marking the location of that region on the drawing.

The cursor head 104 is sometimes provided with a recessed region 104b to accept a push button switch 118 which is connected to an electrical line 119 (FIG. 3) for a purpose to be described.

FIG. 12, illustrates a typical way for securing the extensible rule 24 to the cursor head 104. The rule 24 is inserted within a slot 120 in the head 104. It is secured therein by a pair of dowel screws 122, the heads of which are positioned within a pair of recesses 124, the threads being retained within threaded holes 126 and dowel portions 127 thereof being inserted within a pair of matching holes 128. The extensible arm 24 includes a pair of holes 130 aligned with the holes 128 such that the dowel portions of the dowel screws 122 may be inserted therethrough for retention purposes.

FIG. 13, illustrates a type letter spacing rule used in conjunction with within this invention to facilitate a visualization of spacing requirements for lettering purposes. It is provided with indicia representative of the size of the type utilized on the drawing in conjunction with the equipment of this invention so that the draftsman can readily determine the length of the message and the relative size and position of each of the characters to be imprinted upon the face of his drawing. Thus, the type spacing rule 130 includes a series of boxes 132, representative of a variety of possible types sizes, along each of its edges, each box being representative of the width of one typical character of print. The space 134 between each pair of boxes 132 is representative of the spacing between those characters for a particular type font. Numerical indices are provided for each fifth box to indicate the number of characters therebetween for quick reference purposes. Numbers, etc., are provided on the opposite side of the rule for indications of a similar nature for back spacing purposes and to facilitate use of both edges of the rule. A line 136 lengthwise of the rule centrally of its edges may be provided, in various colors if desired, as a code to indicate the size of the letters represented by that particular instrument type font and for the convenience of the operator.

Figure 14:
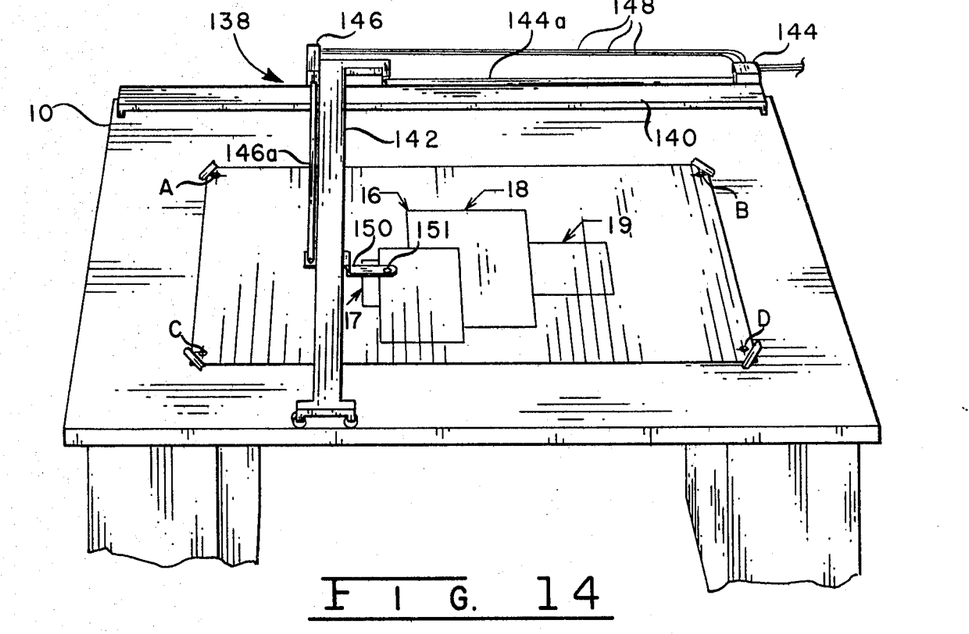
FIG. 14 is a perspective view of a standard X-Y plotter mechanism upon a drafting board and incorporating two potentiometer arms incorporated to define the locator of this invention in an alternative embodiment.
Figure 15:
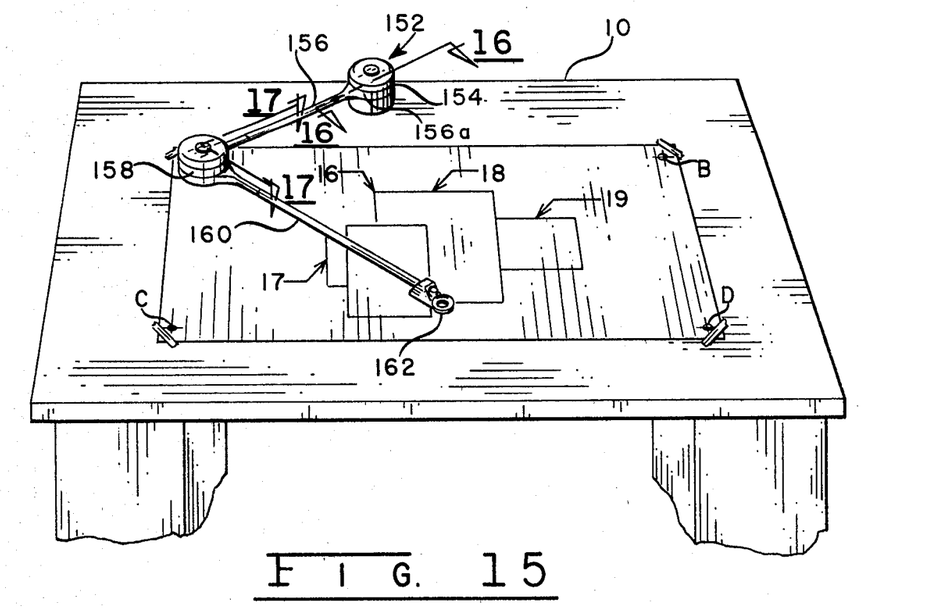
FIG. 15 depicts in a perspective view a locator upon a drafting board and having two arms with a pair of potentiometers connected thereto to define a third embodiment of this invention.
Figure 16:
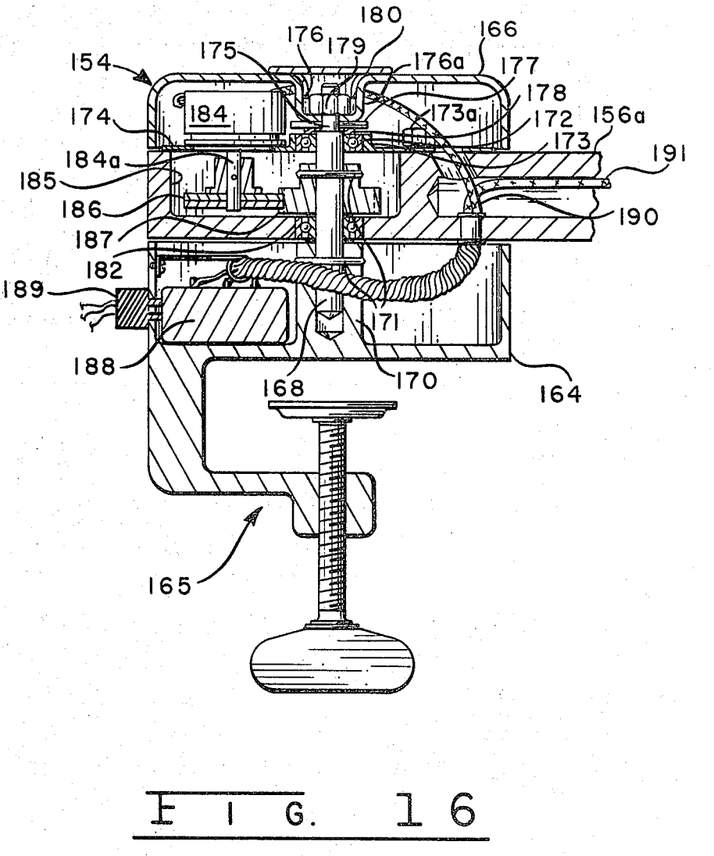
FIG. 16 is a sectional view taken along line 16—16 of FIG. 15, partially cut away.
Figure 17:
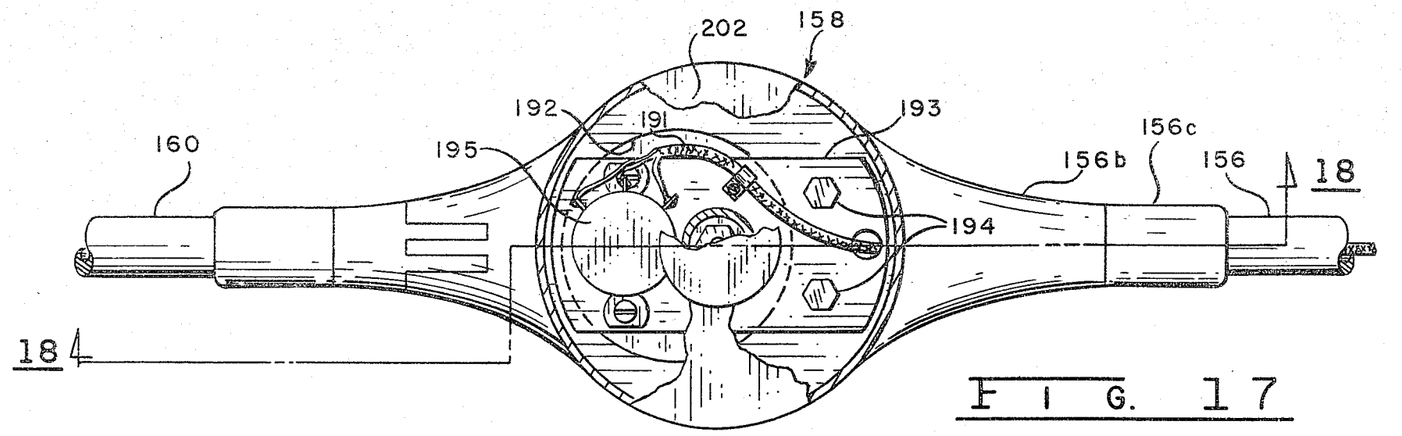
FIG. 17 is a top view taken along 17—17 of FIG. 15 partially cut away.
Figure 18:
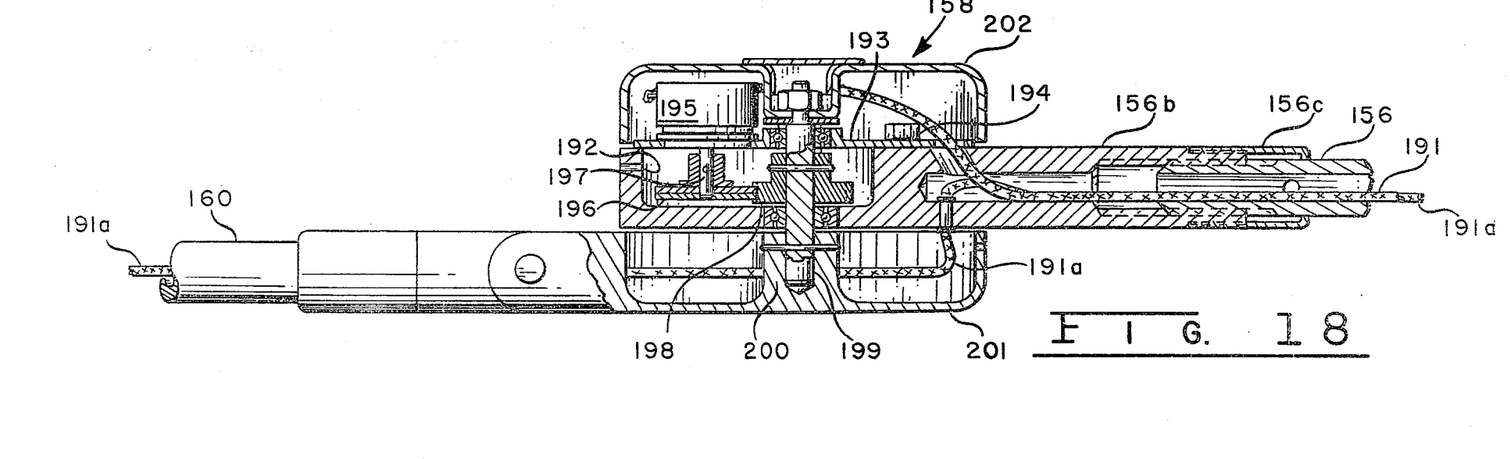
FIG. 18 is a sectional view taken along line 18—18 of FIG. 17.

FIG. 14, includes a showing of a table 10 identical to the table of FIG. 1, but having affixed thereto a second embodiment of the locator system of this invention, that locator being generally indicated by the reference numeral 138. This system is constructed in conjunction with a standard X-Y plotter, as represented by the horizontal bar 140 and a horizontally movable vertical bar 142. The movable bar 142 is adapted to move along the surface of the table 10 in a manner similar to that described with respect to the mechanism of FIG. 2. In this instance, however, a pair of locator components 144 and 146, which are of the nature shown and described in applicant's aforementioned patent application, are attached to the right-hand end of the horizontal bar 140 and to the top of the vertical bar 142, the respective locators being inter-connected by a series of conductors 148 in a manner similar or identical to the potentiometer interconnections described with respect to FIGS. 4–7. The measurement of location in this instance is accomplished by attaching the extensible arm 144a of the locator 144 to the vertical bar 142 and extensible arm 146a to a cursor 150 which is vertically slidable upon the vertical arm 142 for controlled movement thereupon. The cursor 150 may be identical to the cursor 26 described above, or it may be simply a hole 151 within the arm of the cursor 150. Appropriate switch means (not shown) for triggering the signal at any desired location, such as switch 118 on the cursor 26 (FIG. 8) may be provided.

A third embodiment of the invention is more specifically illustrated in FIGS. 15–18. Here again, the basic drafting table 10 has affixed thereto a locator system 152. This system generally comprises a locator and attachment portion head 154 having an upper arm 156 attached to the head for rotation with respect thereto, an elbow portion 158 retained upon an extremity of the upper arm 156 for rotation relative thereto, a lower arm 160 rotatably connected to the elbow 158, and a cursor 162 identical to the cursor 26 attached to an opposite extremity of the lower arm 160.

The locator and attachment head portion 154 (FIG. 16) generally comprises a lower case portion 164 having a clamp means 165 associated therewith for attachment to the table 10. An upper case portion 166 is inter-connected to the lower case portion through a shaft 168 press-fitted into or, as illustrated, retained by a pin 171 in a recessed boss 170 which is integral with the lower case portion 164, to prevent its inadvertent removal from or its rotation within the boss. The top of shaft 168 is mounted within the upper case portion 166 through a bearing 172 pressed into a boss 173 centrally of a plate 174 which is affixed to the upper extremity 156a of the arm 156 as described below. A necked-down portion 175 of the pin extends through a perforation (not numbered) in an indented region 176 centrally within the upper case portion 166. A washer 177 is positioned between a lower extremity of the indented region 176 and a spacer 178 in engagement with the inner race of the bearing 172. The upper case portion 166 is secured upon the shaft 168 by a nut 179 threaded upon an extremity of the necked-down portion 175. A cap 180, usually made from spring steel or plastic, is inserted within the indented region 176 as a dust cover. It will be recognized that the upper case portion 166 is thereby retained in a stationary position in relation to the lower case portion 164.

An upper extremity 156a of the arm 156 is flared outward into a round, washer-like region having a diameter matching that of the upper case 166 and the lower case 164. It is mounted upon and for rotational movement about the shaft 168 through the aforedescribed bearing 172 and a lower bearing 182 press-fitted within the structure of the upper arm extremity 156a. The plate 174 is bolted (as by the bolt 173a) to an upper surface of the arm extremity 156a for movement with it. A potentiometer 184 is mounted upon the plate 174, usually by cleats and screws (as shown in FIG. 6) with a mating region on a lower portion of the potentiometer extending into an appropriate perforation within the plate 174. A potentiometer shaft 184a extends downward into a cavity 185 within the upper arm extremity 156a. Pinned to the potentiometer shaft 184a for rotation with it is an anti-backlash gear 186, the teeth of which are engaged with those of a stationary pinion gear 187 pinned to the shaft 168. Hence, any rotational movement of the arm 156 and its extension 156a about the shaft 168, and with respect to the rest of the head 154, causes the anti-backlash gear 186 to be turned responsive to its engagement with pinion gear 187, thereby rotating the potentiometer shaft 184a and causing a signal to be produced by the potentiometer 184.

The potentiometer is electrically connected to an AC-to-DC power module 188 retained within the lower case 164 so as to receive power therefrom, the power module 188 being connected to an electrical source through a male plug 189. The electrical conductor 190 leads through appropriate passages within the arm extremity 156a. The arm extremity 156a and the upper arm 156 are hollow so as to provide appropriate passages for an electrical conduit 191, also connected to the power module 188.

A lower extremity 156b of the upper arm 156, similar to the upper end, is flared outward to the diameter of the elbow portion 158. The extremity 156b which is usually a separate component from the arm per se, is attached to the arm 156 by a press fit or is screwed thereon in the manner illustrated in FIG. 18 with a dust cap 156c engaged thereover. Similar to the upper extension of the arm 156, the lower extension 156b includes a recess 192, covered by a plate 193 secured to the lower extension 156b by bolt means 194. The plate 193 has secured thereto a potentiometer 195 for the production of an electrical signal. That signal is produced responsive to the rotation of an anti-backlash gear 196 upon a potentiometer shaft 197, the gear 196 being engaged with a pinion gear 198 pinned to a shaft 199.

Again, the shaft 199 is pinned to a boss 200 integrally extending upward from a lower case 201 of the elbow portion 158, the lower case also defining the upper end of the lower arm 160. The shaft 199 extends upward and is bearing-mounted relative to the arm extension 156a centrally of the plate 193 and is retained with respect to an upper case portion 202 of the elbow 158 in a manner identical to that described with respect to the attachment head 154. An electrical conduit 191 leads from the potentiometer 195, through the arm 156 to the power module 188. A second electrical conduit 191a leading through the arm 156 from the power module is directed downward into the lower case 201 of the elbow 158 and outward through the hollow lower arm 160 to the cursor 162. The lower arm 160 is interconnected with the lower case portion 201 in the same way as the arm 156 is attached to the lower extension 156b.

In utilizing this embodiment of the locator system the cursor 162 may be grasped and moved to any location upon the surface of the drawing in the same manner as a conventional drafting machine is used. Once it is positioned over a desired point that point is recorded upon an appropriate recorder, not illustrated, but essentially the same as that shown in FIG. 1, by depressing the cursor button. That, in turn, causes signals from the two potentiometers to be recorded. The cursor button is electrically connected through the conduit 191a. When the button is so depressed, a signal is recorded via the conduit 191 from the potentiometer 195 in the elbow 158, the signal being proportional to the movement of the anti-backlash gear 196. A second signal by the potentiometer 184 is supplied via the conductor 190, that signal being proportional to the movement of the anti-backlash gear 186. These signals, directed through the power module 188, are converted and recorded in the same manner as are the signals supplied by similar components in the locator systems 20 and 138.

Figure 19:
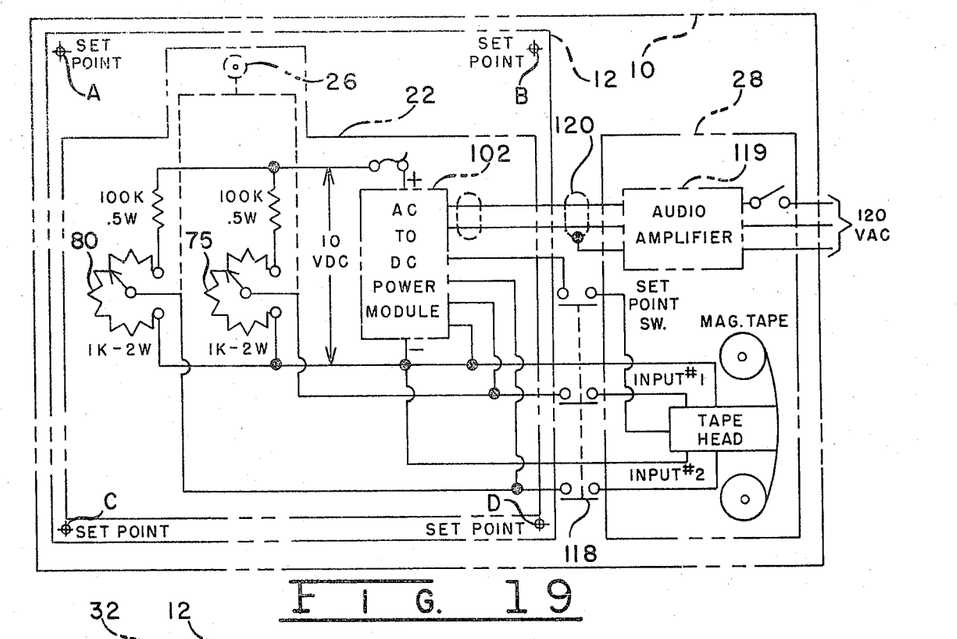
FIG. 19 is an electrical schematic of a typical system of this invention connected to a recorder.

The electronic schematic drawing of FIG. 19 is representative of the respective embodiments of the invention as typically applied. Therein the table 10 and the drawing paper 12 are represented by their respective phantom lines. The basic components of the Locator are shown within the phantom boundary 22 and the basic components of a typical recorder are shown within the phantom boundary 28. Certain of the switches are shown positioned between the locator 22 and the recorder 28, since they may form a portion of either of those systems. The electrical interconnections of the two potentiometers 75 and 80 with the AC-to-DC power module 102 are shown. Those interconnections and their connection to inputs No. 1 and No. 2 of the tape head, as it records upon the magnetic tape, are controlled by the ganged switches representative of the cursor push button switch 118 (FIG. 8). An audio amplifier 119, which receives 120 V power from an outside source and amplifies it for use in the system, is connected to the power module 102 through wires shielded by a floating shield 120.

With the recorder 28 switched "on" the cursor is moved first to one of the set points, set point A, for example, with the cross-hairs 116c of the cursor being positioned exactly over the desired point and the set point switch (button 118) is depressed. A signal is thereby supplied to the recorder, indicating the exact location of set point A. The cursor is next moved to point B and, thence, to set points C and D and the button 118 is depressed in each location to establish the desired point location in each instance. This establishes on the recorder tape the drawing boundary limitations within which a plurality of point locations may be defined. Thereafter all information recorded is in direct relationship to these set point data. Similarly, all points thereafter applied to the surface of the drawing are in accordance with that relationship.

Figure 20:
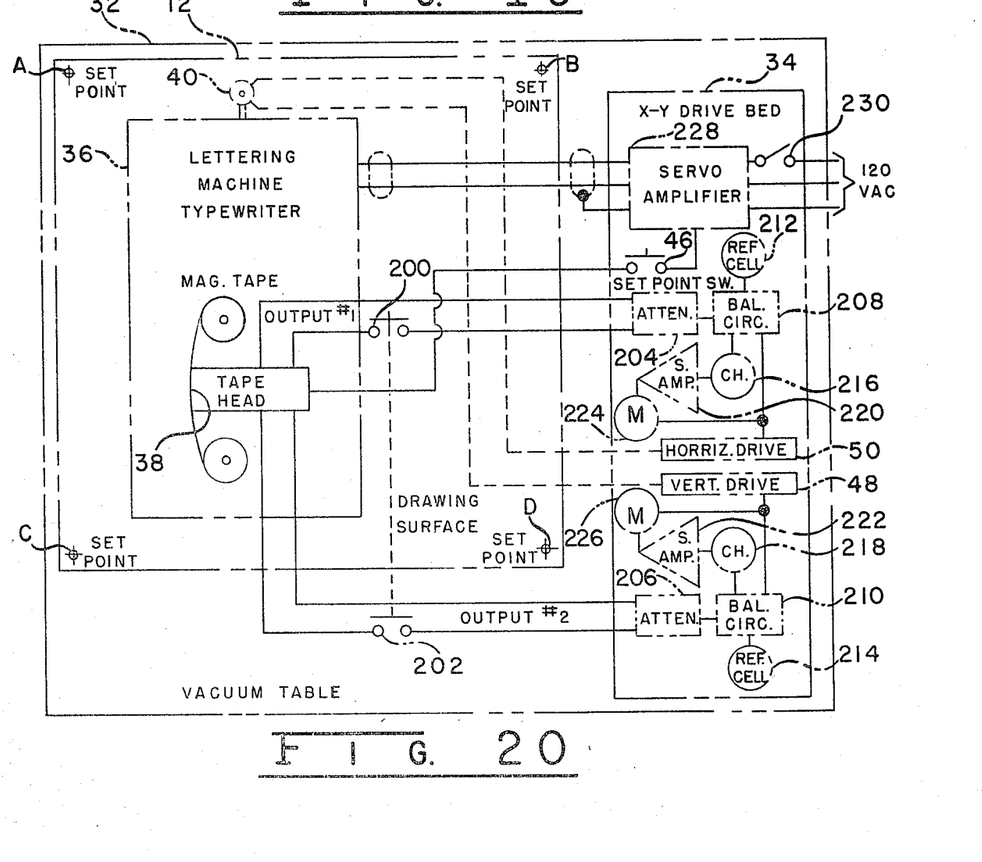
FIG. 20 is an electrical schematic of a drive bed and typewriter for the utilization of data produced by this invention.

After the position of the first lettering to be affixed to the face of the drawing has been determined, the cursor is moved to that location and the set point button 118 is again depressed, thereby establishing that location on the recorder. That point is marked on the face of the drawing, as with a blue fall-out pencil, and the ruler of FIG. 13 is used to determine the correct spacing requirements and the length of the lettering message to be inserted. The data (message) to be recorded are then accomplished by depressing the required data keys upon the recorder 28. The cursor is then moved to the next desired location and the procedure is repeated. This continues until such time as the location of all lettering to be applied to the face of the drawing has been determined and it, together with the lettering itself, has been recorded upon the magnetized tape. FIG. 20 is schematically illustrative of the tape driven typewriter and carriage system shown in FIG. 2, common components thereof being identified by like numbers. Therein the drawing paper 12 is affixed to the vacuum table 32. The lettering machine typewriter 36, with its font 40, its tape head, and its magnetic tape 38 with data recorded thereon, is shown schematically. Outputs No. 1 and No. 2 are controlled by a pair of ganged output switches 200 and 201, respectively connected to attenuators 204 and 206 in the X-Y drive bed 34 and, thence, to balance circuits 208 and 210 having reference cells 212 and 214 respectively connected thereto. The balance circuits feed through channels 216 and 218 and servo amplifiers 220 and 222 to motors 224 and 226 controlling the horizontal drive 50 and vertical drive 48 to move the typewriter 36 and its lettering font 40. The drive bed 34 also incorporates a servo amplifier 228 powered by 120 VAC and controlled by an on-off switch 230. A line having the set point switch 46 therein leads from the servo amplifier 228 to the tape head 38. Similar to the connection between the recorder 28 and the locator 22 in FIG. 19, the amplifier 228 of the X-Y drive bed 34 is connected to the typewriter 36 through an appropriately shielded cable 120a.

Figure 21:
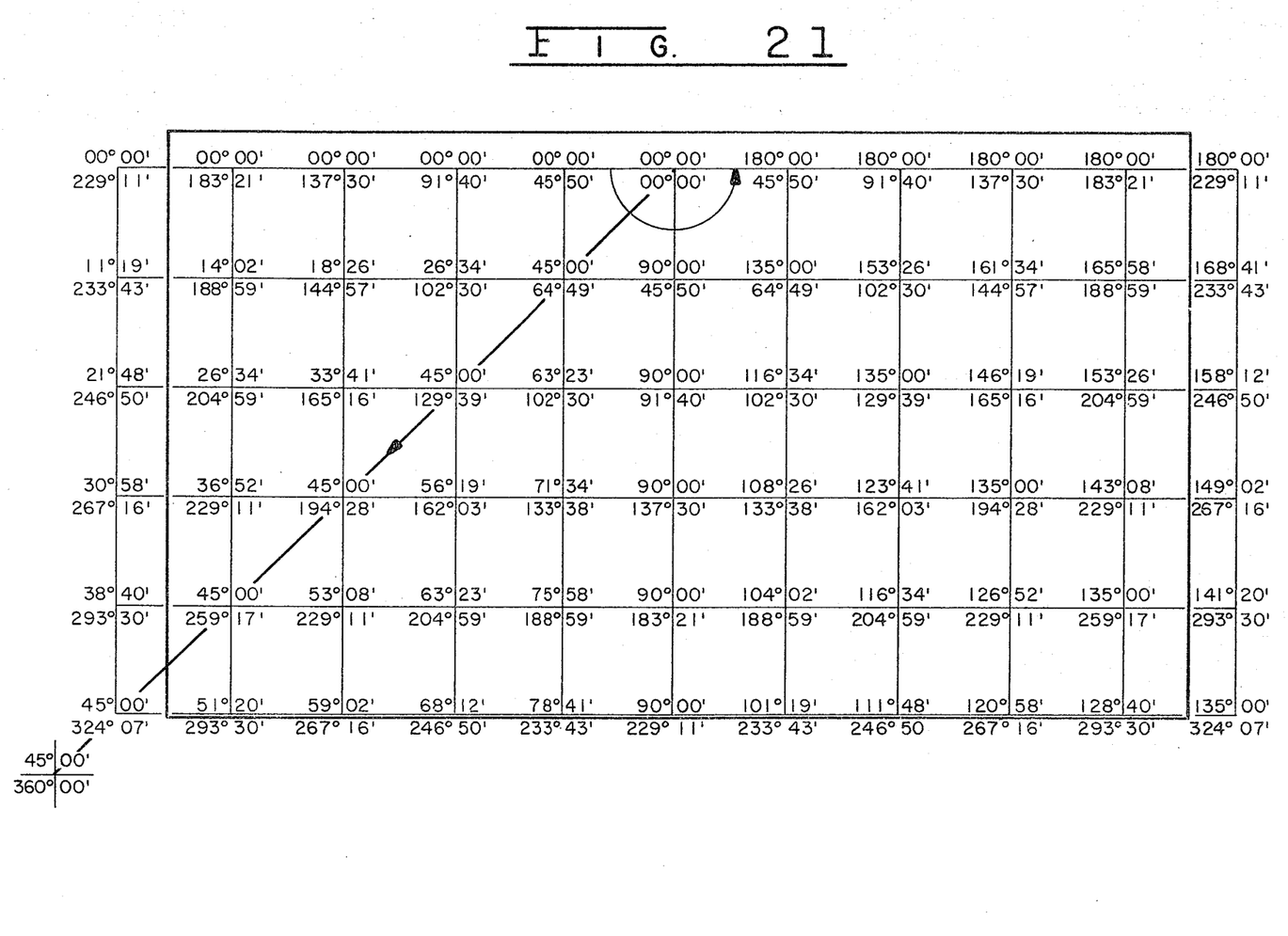
FIG. 21 is a chart indicating the coverage area of this invention and illustrating its ability to locate any point on a standard drawing table.

FIG. 21 is a chart illustrative of the capability of the locator of this invention. It indicates that it is totally adequate to provide the coverage necessary on an oversized American drawing table. Therein the degrees and minutes shown along the top of the chart are representative of the X axis of the potentiometer resistance and those along the bottom are representative of the Y axis of the potentiometer's resistance, shown to the nearest degree and minute and at coordinates of two decimeter square units. Although seconds may also be provided, they have been omitted for clarity of illustration in this chart. This particular representation illustrates a drawing table, 60 inches in width and 42 inches in depth. The locator system of this invention can readily encompass the entire length and depth of this representative table surface. In this instance it is necessary that the extendable arm rule 24 in FIG. 1 must have a total length of 62.832 inches in order to extend the 45 degree distance from its origin to the extreme corner of the board.

It will be recognized that through the various functional features and structural characteristics of this invention each of the objectives set forth above, as well as others not mentioned, can be met.

I claim:

1. A point locator system comprising:
a housing and a movable cursor, the housing including a base portion having means for mounting the base in a selected position along a generally planar surface and a second portion movable relative to the base in response to the positioning of the cursor;
a thin band, curved in cross-section, coupling the cursor to the housing and being movable relative to the base portion of the housing;
means fixedly mounting the cursor to the distal end of the band;
a first potentiometer mounted within the housing and being connected across a voltage source and including a movable arm coupled to respond to movement of the band along one coordinate of a coordinate system capable of mathematically specifying the location of a selected point on said surface, said movable arm thereby generating a first signal representative of the position of the cursor along said one coordinate;
a second potentiometer mounted within the housing and being connected across a voltage source and including a movable arm coupled to respond to movement of the band along an other coordinate of a coordinate system capable of mathematically specifying the location of a selected point on said surface, said movable arm thereby generating a second signal representative of the position of the cursor along said other coordinate; and
means for receiving said first and second signals for recording thereof.

2. The system of claim 1 further including means for selectively applying said first and second signals to the recording means to cause the instantaneous recording of signals corresponding to the position coordinates of the cursor at a selected point on the surface.

3. The system of claim 2 further including means for driving the recording means in order to record a plurality of sets of signals corresponding respectively to a plurality of points on the surface selected by movement of the cursor to said points in succession.

4. The system of claim 1 wherein the band is movable longitudinally between relatively extended and retracted positions as the cursor is moved over said surface relatively away from and toward said housing.

5. The system of claim 4 further including an enclosure for receiving said band as it is retracted and causing the proximal portion of the band as it is retracted to assume a coiled configuration within the enclosure.

6. The system of claim 5 further including a rotatable member mounted within the housing to engage the surface of the band and to rotate in response to longitudinal movement of the band.

7. The system of claim 6 wherein the rotatable member includes a circumferential element having a surface frictionally engaging the surface of the band so as to cause rotation of the member corresponding to longitudinal movement of the band.

8. The system of claim 7 wherein the rotatable member comprises a wheel having a circumferential width generally corresponding to the width of the band and further including an adjacent roller mounted to direct the band against the surface of the wheel in a flattened configuration along the area of contact with the wheel surface.

9. The system of claim 6 wherein the movable arm of the second potentiometer is coupled to a rotatable central shaft, and further including means for coupling said shaft to the rotatable member.

10. The system of claim 9 wherein the shaft coupling means comprises means for coaxially mounting the rotatable member on said shaft for rotation in common therewith.

11. The system of claim 1 wherein the movable arm of the first potentiometer is coupled to a rotatable central shaft, and further including means for mounting the first potentiometer in a stationary position relative to the housing base portion and means for coupling the shaft thereof to the second portion of the housing for movement therewith.

12. A point locator system comprising:
a movable cursor;
housing means including a first housing portion having means for mounting said portion in a selected position along a generally planar surface and a second portion movable relative to the first portion in response to positioning of the cursor;
a thin band, curved in cross-section, coupling the cursor to the housing means and being movable relative to at least one of said housing portions;
means fixedly mounting the cursor to the distal end of the band;
a first potentiometer mounted within the housing means and being connected across a voltage source and including a movable arm coupled to respond to relative movement between the first and second housing portions in response to movement of the cursor over said surface, said movable arm thereby generating a first signal representative of the position of the cursor in one coordinate direction of a coordinate system capable of mathematically specifying the location of a selected point on said surface;
a second potentiometer mounted within the housing means and being connected across a voltage source and including a movable arm coupled to respond to relative movement between the band and the housing means for generating a second signal representative of the position of the cursor in another coordinate direction of a coordinate system capable of mathematically specifying the location of a selected point on said surface; and
means for recording said first and second signals.

13. The system of claim 12 wherein the second housing portion is movable linearly in a first direction relative to the first housing portion and further including first guide means for guiding the movement of the second housing portion.

14. The system of claim 13 wherein the cursor is movable linearly in a second direction relative to the second housing portion, said second direction being orthogonal to said first direction, and further including second guide means for guiding the movement of the cursor relative to the second housing portion.

15. The system of claim 14 wherein the second housing portion is mounted to the second guide means for common movement along said first direction.

16. The system of claim 13 further including a second thin band, curved in cross section, coupled between the second housing portion and the movable arm of the first potentiometer to drive said movable arm in accordance with movement of the second housing portion relative to the first housing portion.

17. The system of claim 16 wherein the coordinate system comprises Cartesian coordinates and the second housing portion is movable in an X direction while the cursor is movable relative to the second housing portion in the Y direction.

18. The system of claim 17 wherein the second thin band is movable longitudinally between relatively extended and retracted positions as the cursor is moved over said surface along an X coordinate direction.

19. The system of claim 18 wherein the first-mentioned thin band is movable longitudinally between relatively extended and retracted positions as the cursor is moved over said surface along a Y coordinate direction.

20. The system of claim 12 wherein the second housing portion is mounted for rotation relative to the first housing portion as the angle of the thin band relative to a reference line is varied during movement of the cursor over said surface.

21. The system of claim 12 wherein the band is movable longitudinally between relatively extended and retracted positions as the cursor is moved over said surface relatively away from and toward said housing means.

22. The system of claim 12 further including an enclosure for receiving said band as it is retracted and causing the proximal portion of the band as it is retracted to assume a coiled configuration within the enclosure.

23. The system of claim 22 further including a rotatable member mounted within the housing to engage the surface of the band and to rotate in response to longitudinal movement of the band.

24. The system of claim 23 wherein the rotatable member includes a circumferential element having a surface frictionally engaging the surface of the band so as to cause rotation of the member corresponding to longitudinal movement of the band.

25. The system of claim 24 wherein the rotatable member comprises a wheel having a circumferential width generally corresponding to the width of the band and further including an adjacent roller mounted to direct the band against the surface of the wheel in a flattened configuration along the area of contact with the wheel surface.

26. The system of claim 23 wherein the movable arm of the second potentiometer is coupled to a rotatable central shaft, and further including means for coupling said shaft to the rotatable member.

27. The system of claim 26 wherein the shaft coupling means comprises means for coaxially mounting the rotatable member on said shaft for rotation in common therewith.

28. The system of claim 18 wherein the movable arm of the first potentiometer is coupled to a rotatable central shaft and further including means for mounting the first potentiometer in a stationary position relative to the first housing portion and means for coupling the shaft thereof to the second portion of the housing for movement therewith.

* * * * *

UNITED STATES PATENT AND TRADEMARK OFFICE
CERTIFICATE OF CORRECTION

PATENT NO. : 4,419,672

DATED : Dec. 6, 1983

INVENTOR(S) : Edwin A. Hird

It is certified that error appears in the above-identified patent and that said Letters Patent is hereby corrected as shown below:

In column 4, line 55, delete "abandoned" and substitute
----U.S. Patent No. 4,535,415----

Signed and Sealed this

Twenty-sixth Day of November 1985

[SEAL]

Attest:

Attesting Officer

DONALD J. QUIGG

Commissioner of Patents and Trademarks